United States Patent
Wo et al.

(10) Patent No.: US 10,613,426 B1
(45) Date of Patent: Apr. 7, 2020

(54) SYSTEM, METHOD AND DEVICE FOR A LONG RANGE, REAL SIZE WEAPON SYSTEMS PLUME SIMULATOR FOR TESTING OPTICAL DETECTION DEVICES IN THE FIELD

(71) Applicant: DHPC Technologies, Inc., Woodbridge, NJ (US)

(72) Inventors: Yei Wo, East Brunswick, NJ (US); Richard Gifford, Toms River, NJ (US); Joseph M. Aletta, Jackson, NJ (US)

(73) Assignee: DHPC Technologies, Inc., Woodbridge, NJ (US)

( * ) Notice: Subject to any disclaimer, the term of this patent is extended or adjusted under 35 U.S.C. 154(b) by 0 days.

(21) Appl. No.: 16/377,132

(22) Filed: Apr. 5, 2019

Related U.S. Application Data

(63) Continuation-in-part of application No. 16/297,538, filed on Mar. 8, 2019, now Pat. No. 10,527,920.
(Continued)

(51) Int. Cl.
*G03B 21/53* (2006.01)
*G01J 3/02* (2006.01)
(Continued)

(52) U.S. Cl.
CPC ............ *G03B 21/53* (2013.01); *G01J 3/0254* (2013.01); *G01J 3/0291* (2013.01); *G03B 21/56* (2013.01);
(Continued)

(58) Field of Classification Search
CPC ........ G03B 21/56; G03B 21/58; G03B 21/62; G03B 21/60; G03B 27/2221
(Continued)

(56) References Cited

U.S. PATENT DOCUMENTS 2,042,174 A * 5/1936 Foisy ..................... A61B 5/162
463/52
2,662,305 A 12/1953 Alric
(Continued)

FOREIGN PATENT DOCUMENTS

| CN | 102004219 | * | 4/2011 | ................ G01J 5/00 |
| CN | 104655111 | * | 5/2015 | ............. G01C 15/00 |
| CN | 104655111 A | | 1/2017 | |

OTHER PUBLICATIONS

John M. Stewart et al., 'Correlated UV Through IR Signature Modeling of Targets and Backgrounds' Georgia Institute of Technology, Nov. 1998, 11 pages (Year: 11).*
(Continued)

*Primary Examiner* — Clayton E. LaBalle
*Assistant Examiner* — Kevin C Butler
(74) *Attorney, Agent, or Firm* — LaMorte & Associates, P.C.

(57) ABSTRACT

A system and method for simulating realistically sized emission signature of a weapon system or weapon platform for the purpose of testing an optical detection device at a long distance in the field. The system utilizes an image screen with a curved imaging surface that is positioned at least one kilometer away from the optical detection device being tested for example. The optical testing device observes the image screen through ambient environmental conditions. A projection device is provided at a first distance from the image screen. The projection device projects a simulation of the emission signature onto the curved imaging surface. The curved imaging surface reflects the simulation toward the optical detection device. A focusing system can be used to adjust the reflection so that the simulation is collimated, converging or dispersing as it progresses toward the optical detection device.

14 Claims, 5 Drawing Sheets

Related U.S. Application Data

(60) Provisional application No. 62/685,117, filed on Jun. 14, 2018.

(51) Int. Cl.
   *G03B 21/60* (2014.01)
   *G03B 21/56* (2006.01)
   *G03B 21/58* (2014.01)
   *G03B 21/62* (2014.01)

(52) U.S. Cl.
   CPC .............. *G03B 21/58* (2013.01); *G03B 21/60* (2013.01); *G03B 21/62* (2013.01)

(58) Field of Classification Search
   USPC .......................................... 359/451; 356/402
   See application file for complete search history.

(56) References Cited

U.S. PATENT DOCUMENTS

| | | | | |
|---|---|---|---|---|
| 3,263,561 A | * | 8/1966 | Jackson | G03B 21/60 359/451 |
| 3,292,491 A | * | 12/1966 | Hourdiaux | G03B 21/56 353/122 |
| 3,420,605 A | | 1/1969 | Kipping | |
| 3,508,056 A | * | 4/1970 | Fricke | G01K 17/003 250/336.1 |
| 3,557,470 A | * | 1/1971 | Emerick et al. | G09B 9/32 434/44 |
| 3,603,726 A | * | 9/1971 | Garber | G06E 3/001 348/123 |
| 3,738,168 A | * | 6/1973 | Mansell | G01J 5/12 374/32 |
| 3,748,751 A | * | 7/1973 | Breglia | F41G 3/2627 434/21 |
| 3,784,742 A | * | 1/1974 | Burnham | G02B 27/0101 348/123 |
| 3,811,204 A | * | 5/1974 | Marshall | F41G 3/2627 434/22 |
| 3,838,856 A | * | 10/1974 | Takeya | F41G 3/2655 463/5 |
| 3,904,204 A | * | 9/1975 | Yokoi | F41G 3/2627 463/52 |
| 3,939,706 A | * | 2/1976 | Pinson | G01J 1/4257 374/32 |
| 3,945,133 A | * | 3/1976 | Mohon | F41G 3/2611 434/20 |
| 3,996,674 A | | 12/1976 | Pardes et al. | |
| 4,037,470 A | * | 7/1977 | Mock | G01K 17/003 374/32 |
| 4,137,651 A | * | 2/1979 | Pardes | F41J 5/10 434/20 |
| 4,175,748 A | * | 11/1979 | Yokoi | F41J 9/14 273/358 |
| 4,223,454 A | * | 9/1980 | Mohon | F41G 3/2627 434/20 |
| 4,229,009 A | * | 10/1980 | Ohta | A63F 9/0291 273/358 |
| 4,321,824 A | * | 3/1982 | Martin | F41J 5/02 250/349 |
| 4,354,737 A | | 10/1982 | Dotsko et al. | |
| 4,440,506 A | * | 4/1984 | Eitel | G01K 17/003 374/32 |
| 4,590,481 A | | 5/1986 | Burditt | |
| 4,657,511 A | * | 4/1987 | Allard | F41G 3/2627 434/20 |
| 4,797,555 A | * | 1/1989 | La Mar | G01J 1/4257 250/336.1 |
| 4,824,374 A | * | 4/1989 | Hendry | F41G 3/2611 434/21 |
| 5,175,575 A | * | 12/1992 | Gersuk | G03B 21/56 352/69 |
| 5,194,006 A | * | 3/1993 | Zaenglein, Jr. | F41G 3/2694 434/19 |
| 5,376,980 A | * | 12/1994 | Gersuk | G03B 21/56 353/94 |
| 5,459,532 A | | 10/1995 | Baba | |
| 5,638,208 A | * | 6/1997 | Walker | G03B 21/56 359/443 |
| 5,823,779 A | | 10/1998 | Muehle et al. | |
| 5,850,225 A | * | 12/1998 | Cosman | G06T 3/005 345/427 |
| 6,176,584 B1 | * | 1/2001 | Best | G09F 19/18 353/30 |
| 6,727,971 B2 | | 4/2004 | Lucas | |
| 6,942,486 B2 | * | 9/2005 | Lvovskiy | F41A 33/02 434/11 |
| 8,185,350 B2 | * | 5/2012 | Deriso, Jr. | F41G 7/002 244/1 N |
| 8,441,625 B2 | * | 5/2013 | Wick, Jr. | G01J 1/4257 356/121 |
| 8,794,967 B2 | * | 8/2014 | Sargent | A63F 13/06 434/19 |
| 8,988,674 B2 | * | 3/2015 | Anikitchev | G01J 1/0407 356/236 |
| 9,042,694 B2 | * | 5/2015 | Silny | G01J 1/0425 385/115 |
| 2003/0180692 A1 | * | 9/2003 | Skala | F41G 1/35 434/22 |
| 2006/0274283 A1 | | 12/2006 | Lin et al. | |
| 2007/0082322 A1 | | 4/2007 | Lvovskiy | |
| 2007/0254266 A1 | * | 11/2007 | Galanis | F41G 3/2627 434/21 |
| 2008/0206720 A1 | | 8/2008 | Nelson | |
| 2010/0240015 A1 | * | 9/2010 | Chung | F41G 3/2694 434/21 |
| 2011/0053120 A1 | | 3/2011 | Galanis et al. | |
| 2011/0207089 A1 | * | 8/2011 | Lagettie | F41G 3/2611 434/22 |
| 2012/0183931 A1 | * | 7/2012 | Galanis | F41J 5/10 434/22 |
| 2013/0040268 A1 | * | 2/2013 | Van der Walt | F41A 33/06 434/16 |
| 2013/0308183 A1 | * | 11/2013 | Vermeirsch | G03B 21/62 359/451 |

OTHER PUBLICATIONS

David M. Krum et al., 'Augmented Reality Using Personal Projection and Retroreflection', University of Southern California, Jan. 1, 2012, 21 pages (Year: 21).*

H.S. Lowry et al., 'Development of HWIL Testing Capabilities for Satellite Target Emulation at AEDC', Arnold Engineering Development Center (AEDC), 2006, 10 pgs (Year: 10).*

\* cited by examiner

SYSTEM, METHOD AND DEVICE FOR A LONG RANGE, REAL SIZE WEAPON SYSTEMS PLUME SIMULATOR FOR TESTING OPTICAL DETECTION DEVICES IN THE FIELD

RELATED APPLICATIONS

This application is a continuation-in-part of U.S. patent application Ser. No. 16/297,538, filed Mar. 8, 2019.

BACKGROUND OF THE INVENTION

1. Field of the Invention

In general, the present invention relates to simulators that are used to simulate the emission signatures of various weapon systems and weapon platforms for the purposes of calibrating and testing detection equipment. More particularly, the present invention relates to simulators that are designed to reproduce the real sized emission signatures of weapon systems and weapon platforms at distances (for example kilometers) so that detection systems can be accurately tested in the field.

2. Prior Art Description

When a weapon system is fired on a battlefield, a projectile is typically launched that is propelled by a burning propellant. This is true for bullets that are fired from guns, shells that are fired from cannons, and rockets that are fired from launchers. As the burning propellant leaves the weapon and enters the ambient environment, the burning propellant produces a visible plume in the air. This visible plume is typically referred to as the emission signature of the weapon system. The emission signature varies in size and spectral content depending upon the weapon system. Weapon platforms, such as aircraft, large land vehicles and various watercraft also have engine emission signatures that can be used to identify the weapon platform.

On a battlefield, it is highly advantageous to locate an enemy position and to identify the weapon platform, weapon system, and ammunition type being used by the enemy at that position. It is for this reason that militaries around the world have developed emission profile detection systems. Such detection systems are becoming commonplace in tanks, command vehicles, aircraft and the like. As the technology improves, such detection systems are even being carried by individual soldiers. Some detection systems merely attempt to detect the location of enemy fire. More sophisticated systems can identify the type of the weapon system on the battlefield, the weapon being fired, and the ammunition being used by that weapon system.

In order to develop, test and improve various detection systems for use on a battlefield, the detection systems must be exposed to repeated emission profiles of many weapon systems and weapon platforms. This requires that weapon systems be repeatedly fired with different ammunition and that the weapon platform be in constant use in a testing area. This course of testing is highly expensive and inconvenient. It requires that both exotic and common weapon platforms and weapon systems be obtained, maintained, loaded and fired. This, in turn, requires skilled weapon operators, a large complex firing range, and vast supplies of expensive ammunition. Accordingly, testing detection systems by firing real weapons is far too expensive and problematic to be practical.

Many of the problems associated with testing weapons fire on a battlefield can be removed by simulating weapons fire. Using various emitters, the emission signature of a selected weapon system or weapon platform can be mimicked. However, such emitters cannot merely be pointed at a detection device. On a battlefield, the emission signature of a weapon system or a weapon platform moves relative the detection system. This is due to the movement of the observer, the movement of the enemy and/or the nature of the weapon being fired. Accordingly, in order to accurately simulate a weapon system or a weapon platform, a simulated emission profile must occur while moving within a large field of view.

One of the few practical ways to simulate an emission signature across a large field of view is to project the simulated flash plume onto a screen. The screen is used to fill the field of view of a detection system. Using a projection on a screen, a simulated emission signature can be easily manipulated to move across the field of view. Shining light onto a screen for detection by a camera system for varied purposes is a utilized technology exemplified by U.S. Patent Application Publication No. 2012/0183931 to Galanis. However, such systems cannot be adapted to the present need. When light, both visible and infrared, is projected onto a screen, only a small fraction of that light is reflected back from any point on the screen to an observer. As such, in order for a few points on a screen to reflect back a realistic emission signature of a fired weapon system, the initial light projected onto the screen would have to be orders of magnitude greater than the real emission signature. Projecting such energy would require very powerful and expensive projectors. The energy could also melt, burn or warp a traditional image screen. As such, a specialized high-temperature screen would have to be utilized and operators of the system would have to wear protective gear.

Another problem with simulating an emission signature of a weapon system or a weapon platform, is that the image screen is typically positioned within ten meters of the detector. Emission signatures of weapons fire contain wavelengths across wide bands of the spectrum. The emission signature contains light in the infrared band, red band, blue band, and ultraviolet band. Each of these frequency bands are affected differently as it propagates any significant distance through the atmosphere. Different frequencies are absorbed, scattered and blocked not only by the air in the atmosphere, buy by the smoke, dust, rain and/or mist that may be present on a battlefield.

Most firing range simulators are designed to operate indoors. In this manner, losses due to environmental factors are constant. Such simulators are exemplified by U.S. Pat. No. 5,823,779 to Muehle and U.S. Pat. No. 2,662,305 to Alric. Such simulators cannot be used to calibrate sensitive emission profile detection equipment, because the signals losses created by environmental factors acting across long distances, cannot be reproduced in the simulation.

Accordingly, a great need exists for creating an emission signature simulator that can accurately simulate the emission signature of a weapon system that can accurately reproduce losses caused by environmental factors and distance. This need is met by the present invention as described and claimed below.

SUMMARY OF THE INVENTION

The present invention is a system and method for simulating an emission signature of a weapon system or weapon platform for the purpose of testing an optical detection device. The system utilizes an image screen with a curved imaging surface that is positioned at least one kilometer away from the optical detection device being tested. The optical testing device observes the image screen through at least one kilometer of ambient environmental conditions.

A projection device is provided at a first distance from the image screen. The projection device projects a simulation of the emission signature onto the curved imaging surface. The curved imaging surface reflects the simulation toward the optical detection device.

A focusing system can be used to adjust the reflection so that the simulation is collimated, converging or dispersing as it progresses toward the optical detection device.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

The present invention system and method can be used to test, calibrate and otherwise develop a variety of specialty cameras and sensor arrays that are purposed for detecting the emission signature of a weapon system and/or a weapon platform. The camera system or sensor array being tested is herein referred to as the Device Under Test (DUT) in the following description. The present invention simulates the emission signature from a variety of weapon systems and weapon platforms at a variety of positions and orientations for detection by the DUT. Three exemplary embodiments of the present invention system are illustrated and described. The exemplary embodiments are selected in order to set forth some of the best modes contemplated for the invention. The illustrated embodiments, however, are merely exemplary and should not be considered limitations when interpreting the scope of the appended claims.

Figure 1:
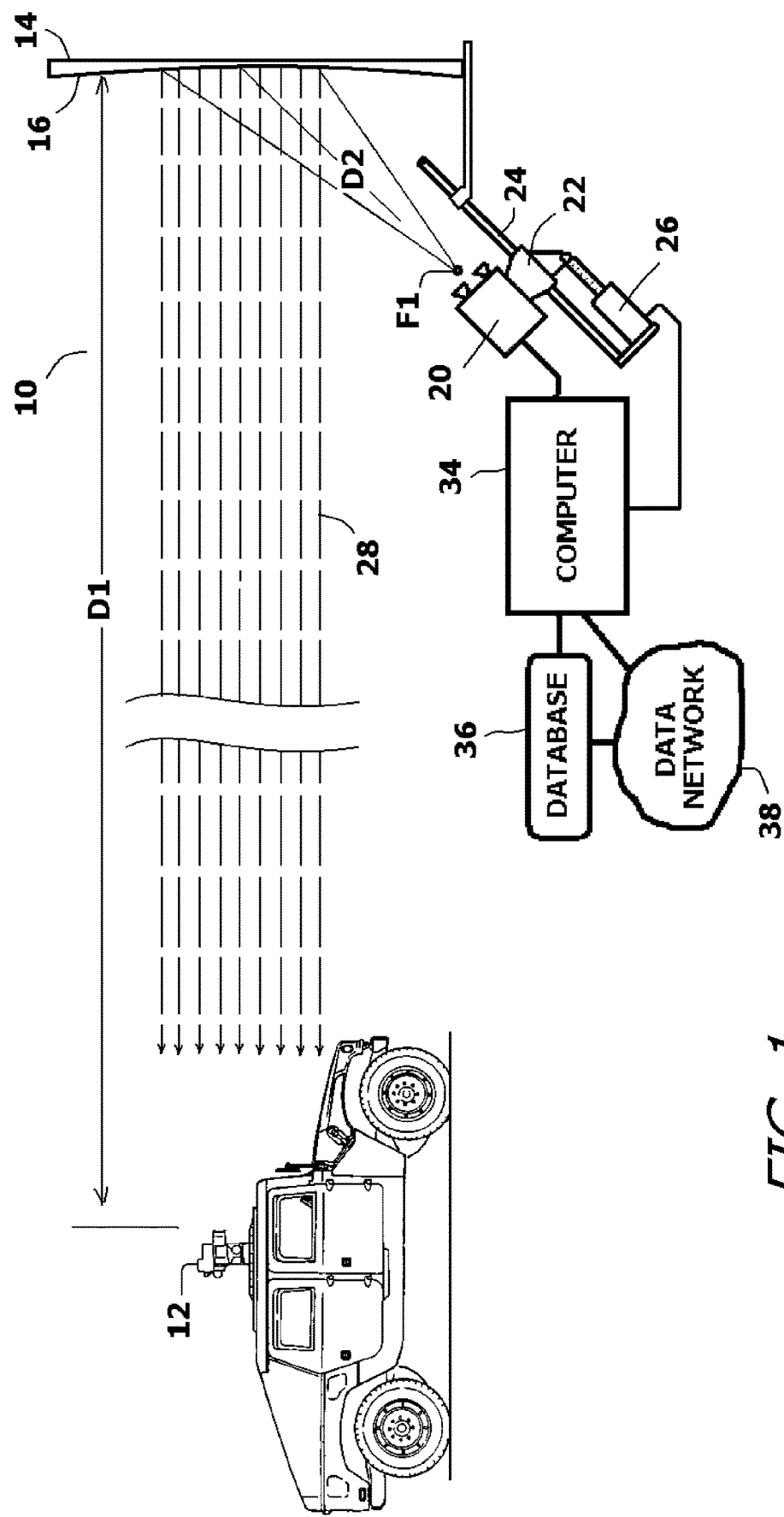
FIG. 1 is a schematic showing the hardware requirements of an exemplary embodiment of the present invention system, wherein the system is configured to produce a collimated reflection.

Referring to FIG. 1, the hardware requirements of the present invention simulation system 10 are shown. The simulation system 10 simulates a weapon flash plume signature and/or a vehicle engine emission signature for detection by a Device Under Test (DUT) 12. As previously explained, the DUT 12 can be any existing emission signature detection system or any emission signature detection system under development or in need of calibration. Accordingly, the DUT 12 is primarily an optical system that is designed to locate and/or identify enemy fire by analyzing the optical and spectral characteristics of an emission signature of a weapon system or platform, as seen from afar.

The optical characteristics detected by the DUT 12 include the spectral frequencies presented by the emission signature, the duration of the emission signature, and the intensity/size of the emission signature.

The DUT 12 can come in a verity of shapes and sizes, depending upon its use on a battlefield. For instance, if the DUT 12 is a sensor array from a tank or a helicopter, it will be larger and more complex than a DUT 12 carried by a soldier in the field.

To test the DUT 12 using a simulation, an image screen 14 is set in place in an open indigenous environment. The image screen 14 can be set in any environment desired, such as a dusty desert, a fog laden field, a misty beach, or the like. In every application, the temperature, humidity, barometric pressure and amount of air particulates will vary. As such, in every application, the ability of the atmosphere to absorb and scatter different frequencies of light will differ.

The signature emissions of a weapon system or a weapon platform contain a red frequency band, a blue frequency band, and an infrared frequency band, among others. The red frequency band and the blue frequency band travel better through air than do the infrared frequency band. Infrared light tends to be absorbed and scattered by the various air molecules and fine particulates in the ambient atmosphere. As such, for long range detection, emphasis is placed on the intensity of light in the red frequency band and the blue frequency band. The intensity of red frequency band is calculated using Equation 1 below.

$$I_{Red1}=I_{Red0} \times e^{-\tau_{Red} r} \quad \text{(Equation 1)}$$

Where ($I_{Red1}$) is the intensity of red frequency band at distance (r).

($I_{Red0}$) is the intensity of red frequency band at zero distance.

($\tau$) is the light absorption coefficient of red band light in the ambient environment.

Likewise, the intensity of blue band light is calculated using Equation 2 below.

$$I_{Blu1}=I_{Blu0} \times e^{-\tau_{Blu} r} \quad \text{(Equation 2)}$$

Where ($I_{Blu1}$) is the intensity of blue frequency band at distance (r).

($I_{Blu0}$) is the intensity of blue frequency band at zero distance.

($\tau$) is the light absorption coefficient of blue frequency band in the ambient environment.

The red-to-blue ratio of the intensity would, therefore, be the intensity of the red band intensity ($I_{Red1}$) divided by the blue band intensity ($I_{Blu1}$) for a given distance (r). By way of example, a typical light absorption coefficient ($\tau$) is approximately 5 percent per 10 meters distance (r). Using these values, the ratio (R) of the red frequency band and the blue frequency band reduces to the following estimate equation.

$$R=R_0 \times e^{-(\tau_{Red}-\tau_{Blu}) r} \quad \text{Equation 3}$$

Where $R_0$ is the initial red-blue ratio projected onto the image screen 14.

Once the image screen 14 is erected, the DUT 12 is positioned where it is in line of sight of the image screen 14. Accordingly, the DUT 12 is mounted at a first position at a first distance D1 from the image screen 14. The first distance D1 can be any distance desired for the test, environment and circumstances. However, the present invention simulation system 10 is particularly designed to optimize testing at a distance D1 between the DUT 12 and the image screen 14, wherein the distance D1 is at least one kilometer and is preferably at least two kilometers.

Figure 2:
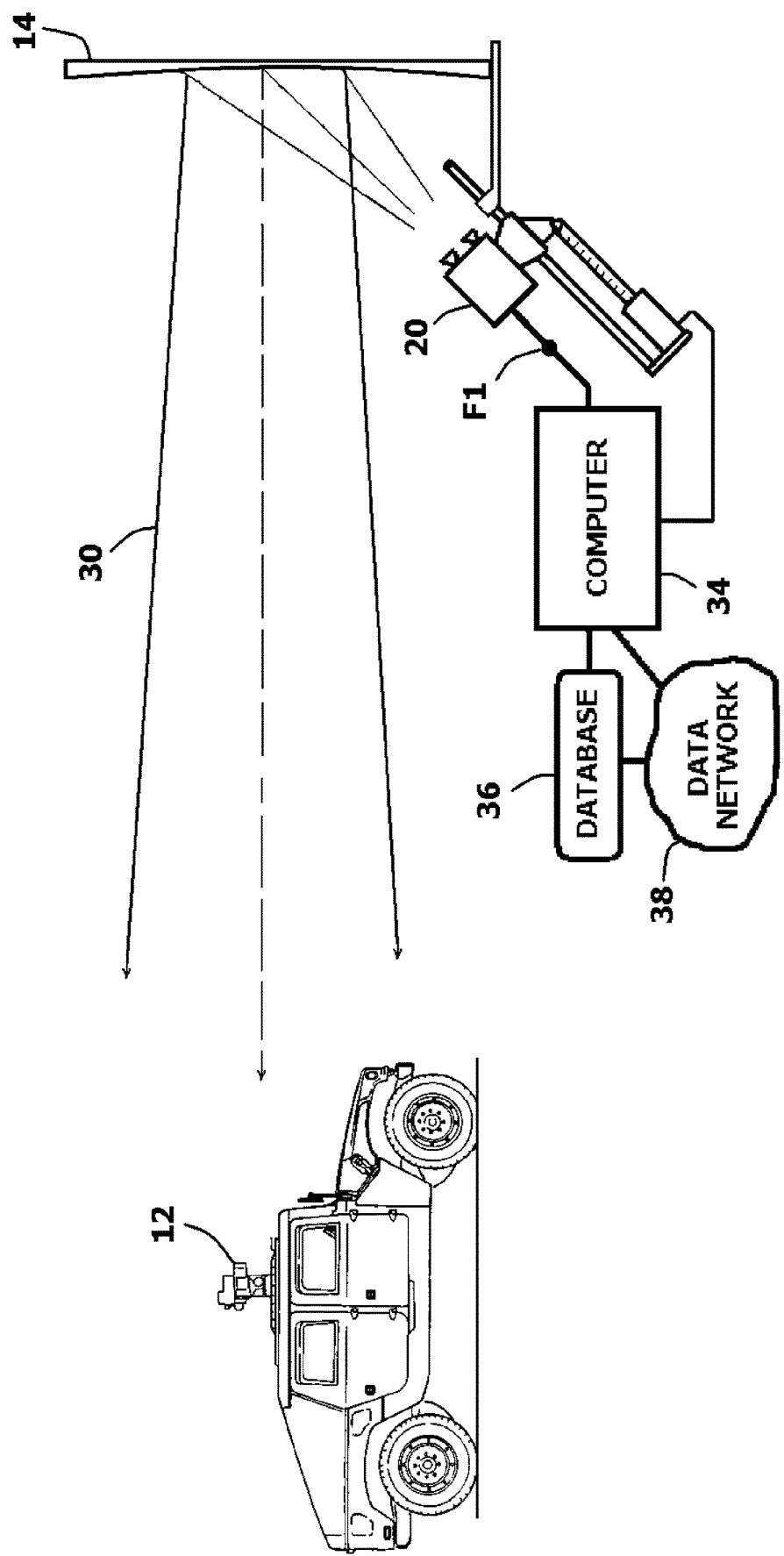
FIG. 2 shows the optical characteristics of the projection device and image screen used in the exemplary system of FIG. 1, while configured to produce a diverging reflection.

Referring to FIG. 2 in conjunction with FIG. 1, it can be seen that the image screen 14 has a curved imaging surface 16 that is reflective to the wavelengths within the emission signature. The imaging surface 16 has a concave curvature. The preferred curvature is parabolic or near parabolic. As such, the imaging surface 16 of the image screen 14, can be considered to have a focal point F1. Any emission originating at the focal point F1 and reflecting from the imaging surface 16 will tend to be collimated or confined to some degree.

A projection system 20 is provided. The projection device 20 is positioned a second distance D2 from the image screen, where the second distance is preferably less than ten meters. The projection device 20 contains laser emitters that can simulate the emission signature of a weapon system or a weapon platform throughout a wide spectrum band. The projection device 20 may be a single projector unit, or multiple projector units, whereby each projector unit projects images in a specific frequency range. For example, one projector can be provided for projecting light in the visible spectrum and another projector can be provided to project light in the infrared spectrum.

The position of the projection device 20 relative to the image screen 14 depends largely upon the area of the image screen 14. As previously stated, the distance D2 between the projection device 20 and the image screen 14 is less than ten meters, with most applications being less than three meters. The positioning of the projection device 20 this close to the image screen 14 has certain advantages. Being very close to the image screen 14, the atmospheric losses between the projection device 20 and the image screen 14 can be ignored. Furthermore, depending upon the selected size of the image screen 14, the projection device 20 is capable of emitting an emission signature of a weapon system or a weapon platform that is realistic in size. That is, the image projected onto the image screen 14 will be the true size of an emission of a real weapon. For example, if the system is being used to simulate the muzzle flash of a rifle that produces a flash that is approximately one meter long and one have meter wide, the projection device 20 can project the emission signature onto the image screen 14 with a simulation having the same dimensions. In this manner, the DUT 12 observing the image screen 14 from two kilometers away will see a highly realistic simulation of the fired weapon system, wherein the simulation has the same emission profile, the same shape, the same size as the muzzle flash of the real weapon.

The projection device 20 can be fixed in place but is preferably mounted to a sled 22 on a guide track 24. The sled 22 is connected to a computer-controlled drive mechanism 26 that can move the sled 22 along the guide track 24. In this manner, the projection device 20 can be moved closer to the image screen 14 than the focal point F1 or farther away from the image screen 14 than the focal point F1. In this manner, the moving projection device 20 can be used as a focusing mechanism.

In FIG. 1, the projection device 20 is positioned with its output at the focal point F1 of the image screen 14, at a distance D2 from the image screen 14. The result is that the emission profile emitted by the projection device 20 will be mostly collimated by the image screen 14. The light travelling toward the DUT 12 is, therefore, mostly confined to a confined beam 28 that is no wider than the image screen 14. This minimizes transmission losses between the DUT 12 and the image screen 14. However, it also requires that the DUT 12 be aligned with the image screen 14 prior to testing.

Referring to FIG. 2, in connection with FIG. 1, it can be seen that the projection device 20 can be moved closer to the image screen 14 than the focal point F1. This will cause the image screen 14 to reflect the emission profile in a diverging beam 30. At a distance of two kilometers, this diverging beam 30 can be quite large. This would enable multiple DUTs 12 to be tested at once. It is also useful in aligning a DUT 12 with the image screen 14. A large divergent beam 30 can be initially used to find the DUT 12. The diverging beam 30 can then be progressively decreased in size, while bringing the DUT 12 into alignment.

Figure 3:
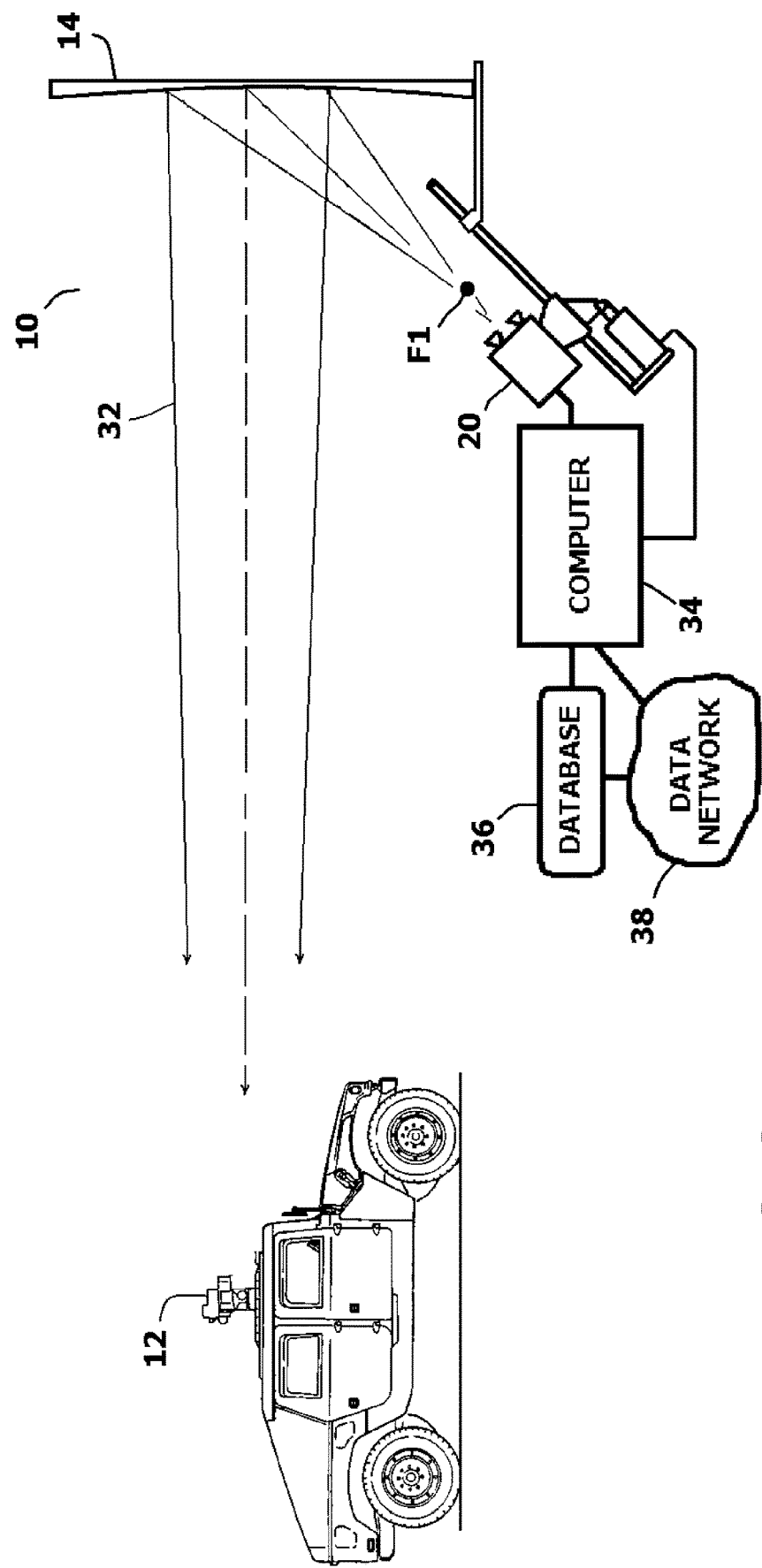
FIG. 3 shows the optical characteristics of the projection device and image screen used in the exemplary system of FIG. 1, while configured to produce a converging reflection.

Referring to FIG. 3, in connection with FIG. 1, it can be seen that the projection device 20 can be moved farther from the image screen 14 than the focal point F1. This will cause the image screen 14 to reflect the emission profile in a converging beam 32. At a distance of two kilometers, this converging beam 32 can be quite localized. This enables the projection device 20 to project emission signatures of higher power than can be generated by the various laser emitters in the projection device 20. For example, if the converging beam 32 converges by two-fold by the time it reaches the DUT 12, then the emission signature being transmitted would double in intensity.

It will be understood that the area of the beam projected toward the DUT 12 from the image screen 14 is not relevant to calculating the ratio of red band light to blue band light that has been expressed using Equation 1, Equation 2 and Equation 3. Accordingly, using the collimated configuration of FIG. 1, the divergent configuration of FIG. 2 or the divergent configuration of FIG. 3, the DUT 12 can determine the same intensity ratio. The intensity ratio can then be used to analyze different emission signatures to understand how those emission signatures change over a long distance, such as two kilometers, for different ambient conditions.

The simulation system 10 is operated by a computer 34. The computer 34 has access to a database 36 of emission signatures. This database 36 may be within the computer 34 or accessible by the computer 34 from another source, via a data network 38. Each emission signature may have a recoded profile from an actual weapon system or weapon platform that was used by an enemy. The database 36 can contain thousands of entries for various weapon systems and weapon platforms at different distances and angles to the observer. Accordingly, when a particular emission signature is selected for display, the emission signature is projected onto the image screen 14 and observed by the DUT 12. The DUT 12 can therefore be tested, calibrated or otherwise developed without having to incur the expense and complex logistics of observing live fire.

When an emission signature is projected toward the image screen 14, some of that energy is absorbed or otherwise dissipated by the image screen 14. The image screen 14 has a set value for reflectivity. Reflectivity is the ratio of the power of the reflected signal to the power of the incoming signal. The amount of losses is often dependent upon the intensity of the emission. The present invention simulation system 10 can automatically compensate for such losses. For example, suppose four percent (4%) of infrared energy and two percent (2%) visible light energy are lost by reflecting off the image screen 14. The simulation system 10 can increase the projected emission signature to compensate for the losses so that the energy received by the DUT 12 is highly accurate.

It will also be understood that the emission signatures themselves can be simulations rather than actual recordings of enemy fire. If the emission signatures of a weapon system are particularly well known, then a battlefield scenario can be simulated, and the appropriate emission signature added to the simulation when a simulated weapon system is fired.

Figure 4:
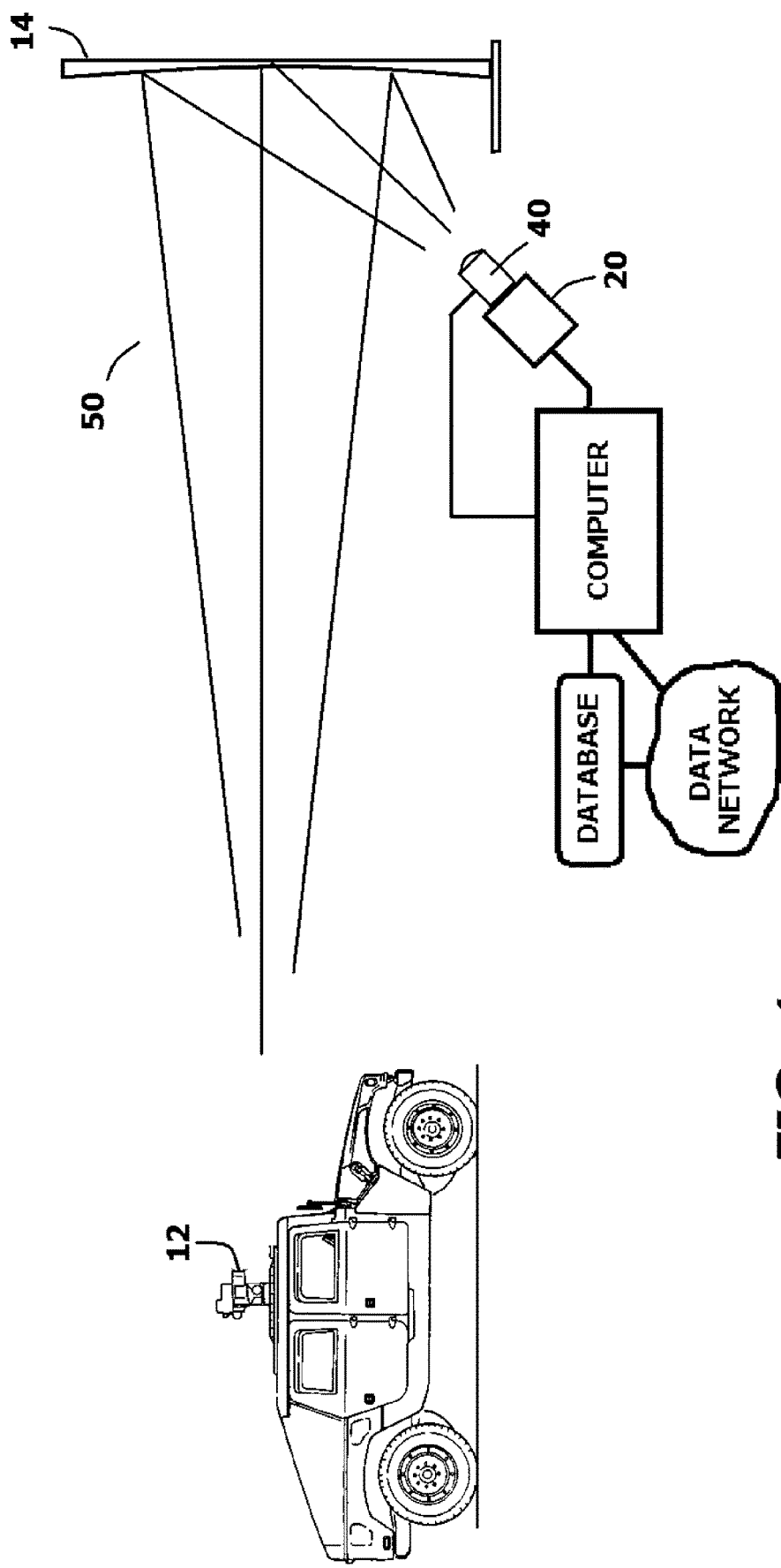
FIG. 4 shows an alternate embodiment of the present invention system where a lens system is used for focusing.

In the embodiment of FIG. 1, FIG. 2 and FIG. 3, the emission signature can be selectively focused by moving the projection device 20 relative to the image screen 14. It will be understood that other focusing systems are possible. Referring to FIG. 4, a configuration of the simulation system 50 is shown where the projection device 20 is fixed in place relative the image screen 14. A computer controlled focus lens assembly 40 is provided. The focus lens assembly 40 is positioned between the projection device 20 and the image screen 14. The emission signature emitted by the projection device 20 can be focused by the focus lens assembly 40. Accordingly, the emission signature can be caused to focus with great precision at a selected distance from the image screen 14. The DUT 12, therefore, can be positioned within a range, for example one kilometer to three kilometers, from the image screen 14 and the simulation system 50 can still be used.

Figure 5:
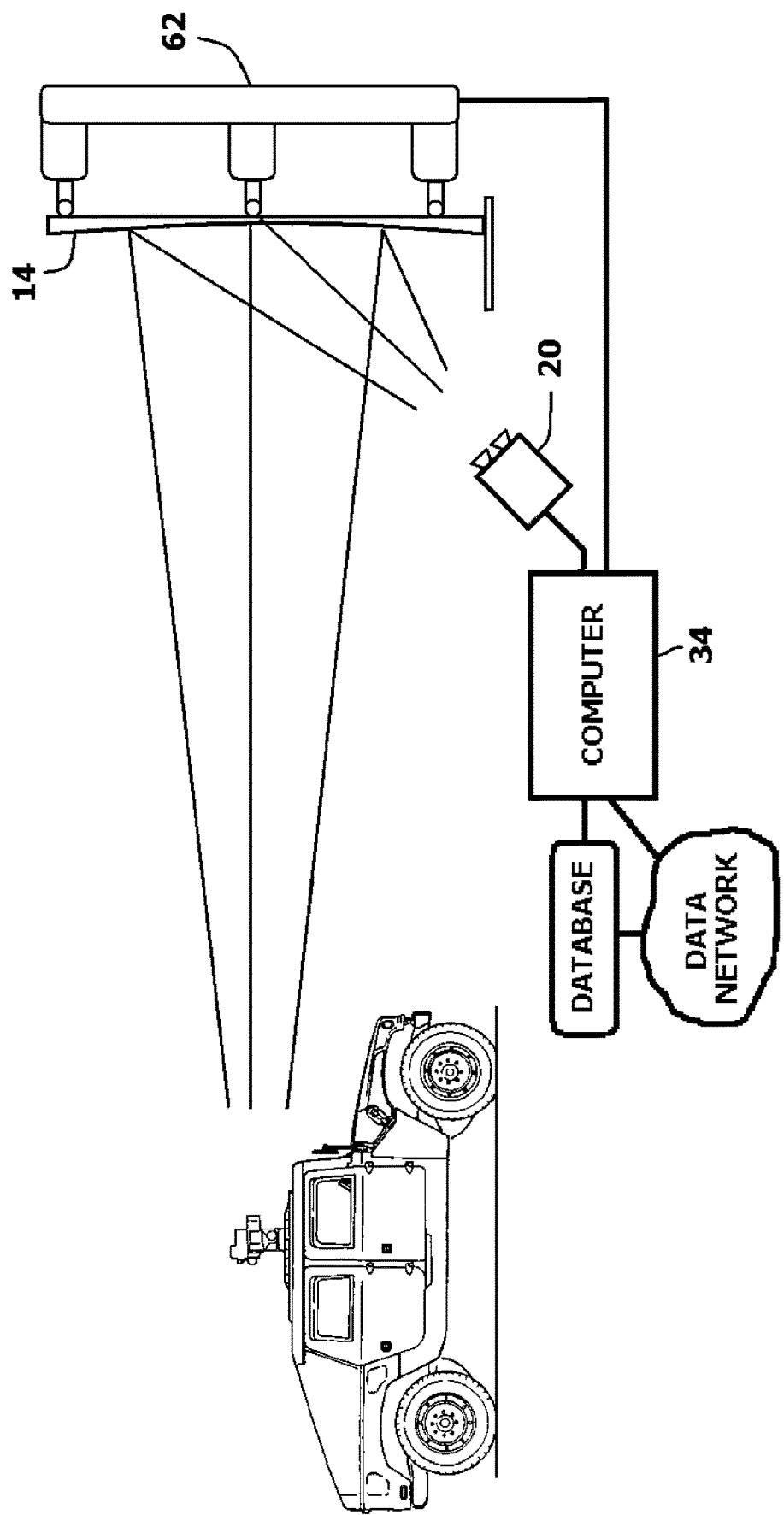
FIG. 5 shows an alternate embodiment of the present invention system where image screen curvature is used for focusing.

Referring to FIG. 5, a configuration of the simulation system 60 is shown where the projection device 20 is stationary, but the curvature of the image screen 14 can be selectively altered by a curvature control system 62 that is operated by the computer control. Using this system, the curvature of image screen 14 can be nominally parabolic and can be adjusted to be slightly wider or narrower than parabolic as required. Accordingly, the emission signature can be caused to focus with great precision at a selected distance from the image screen 14. The DUT 12, therefore, can be positioned within a range, and the simulation system 60 can still be used.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A testing system that simulates an emission signature of a weapon system, said system comprising:
   an image screen, wherein said image screen has a curved imaging surface;
   a projection device a first distance from said image screen, wherein said projection device projects a simulation of said emission signature onto said curved imaging surface,
   an optical detection device for detecting said simulation at a second distance from said image screen,
   wherein said curved imaging surface reflects said simulation toward said optical detection device; and
   a focusing system for selectively focusing said simulation between said projection device and said optical detection device, wherein said focusing system includes a mechanism that selectively alters said first distance.

2. The testing system according to claim 1, wherein said focusing system includes a focus lens assembly that selectively focuses said simulation produced by said projection device.

3. The testing system according to claim 1, wherein said focusing system selectively alters said curved imaging surface of said image screen.

4. The testing system according to claim 1, wherein said curved imaging surface has a curvature with a focal point, wherein said projection device is positioned at said focal point.

5. The testing system according to claim 3, wherein said curved imaging surface has a parabolic curvature.

6. The testing system according to claim 1, wherein said second distance between said image screen and said optical detection device is at least one kilometer.

7. The testing system according to claim 1, wherein said first distance between said image screen and said projection device is no greater than ten meters.

8. A testing system that simulates an emission signature of a weapon system, said system comprising:
   an image screen having a curved imaging surface;
   a projection device a first distance from said image screen, wherein said projection device projects a simulation of said emission signature onto said curved imaging surface,
   an optical detection device for detecting said simulation at least one kilometer from said image screen, wherein said curved imaging surface reflects said simulation toward said optical detection device; and
   a focusing system for selectively focusing said simulation between said projection device and said optical detection device, wherein said focusing device has a mechanism that selectively alters said curved imaging surface of said image screen.

9. The testing system according to claim 8, wherein said focusing system selectively alters said first distance between said projection device and said image screen.

10. The testing system according to claim 8, further including a lens assembly that selectively focuses said simulation produced by said projection device.

11. The testing system according to claim 8, wherein said curved imaging surface of said image screen is alterable between different focal points.

12. The testing system according to claim 8, wherein said curved imaging surface has a curvature with a focal point, wherein said projection device is positioned at said focal point.

13. The testing system according to claim 8, wherein said curved imaging surface has a parabolic curvature.

14. A simulator system that simulates an emission signature of a weapon system for detection at a test point at least one kilometer away, said system comprising:
   a projection device that projects a simulation of said emission signature;
   an image screen a first distance from said projection device, wherein said image screen has a curved imaging surface that reflects said simulation toward said test point;
   an automated mechanism for selectively adjusting said first distance between said image screen and said projection device.

* * * * *